US012544750B2

(12) United States Patent
Ben-Avraham et al.

(10) Patent No.: US 12,544,750 B2
(45) Date of Patent: Feb. 10, 2026

(54) MULTI-TIERED PIPETTE TIP HOLDER AND EJECTION MECHANISM FOR A DYNAMIC BROAD VOLUMETRIC RANGE PIPETTE

(71) Applicant: DeNovix Inc., Wilmington, DE (US)

(72) Inventors: Benayah Ben-Avraham, Wynnewood, PA (US); Daniel Schieffer, Garnet Valley, PA (US); David L. Ash, Hockessin, DE (US); Fernando Frederick Kielhorn, Wilmington, DE (US); David B. Ward, Downingtown, PA (US)

(73) Assignee: DeNovix Inc., Wilmington, DE (US)

( * ) Notice: Subject to any disclaimer, the term of this patent is extended or adjusted under 35 U.S.C. 154(b) by 287 days.

(21) Appl. No.: 18/239,609

(22) Filed: Aug. 29, 2023

(65) Prior Publication Data

US 2024/0066518 A1 Feb. 29, 2024

Related U.S. Application Data

(60) Provisional application No. 63/402,858, filed on Aug. 31, 2022.

(51) Int. Cl.
*B01L 3/02* (2006.01)

(52) U.S. Cl.
CPC ........... *B01L 3/0231* (2013.01); *B01L 3/0217* (2013.01); *B01L 3/0227* (2013.01); *B01L 3/0237* (2013.01);

(Continued)

(58) Field of Classification Search
CPC .... B01L 3/0231; B01L 3/0217; B01L 3/0227; B01L 3/0237; B01L 3/0279; B01L 2200/023; B01L 2200/04
See application file for complete search history.

(56) References Cited

U.S. PATENT DOCUMENTS 5,916,524 A 6/1999 Tisone
6,601,433 B2 8/2003 Kriz et al.

(Continued)

FOREIGN PATENT DOCUMENTS

EP 1688180 A1 8/2006
JP S61-212336 A 9/1986

OTHER PUBLICATIONS

International Search Report and Written Opinion in International Patent Application No. PCT/US2023/031425 mailed Jan. 15, 2024.

*Primary Examiner* — Benjamin R Schmitt
(74) *Attorney, Agent, or Firm* — MEDLER FERRO WOODHOUSE & MILLS PLLC

(57) ABSTRACT

Broad volumetric range pipettes with multi-tiered pipette tip holder and ejection assemblies and methods of using such pipettes are disclosed herein. These pipettes typically include a concentric cylinder arrangement with each outer cylinder configured for contacting and dislodging a pipette tip attached to the tip holder portion of the immediately adjacent inner cylinder. In this manner, different sized pipette tips can be used on a single device. In addition, a locking mechanism is described for locking the large tip holder into a downward position to minimize the extension of the small tip holder and thereby enabling attachment of large, filtered pipette tips and reducing/eliminating the risk that the liquid being transferred will contaminate the pipetting device.

22 Claims, 8 Drawing Sheets

(52) U.S. Cl.
CPC ....... *B01L 3/0279* (2013.01); *B01L 2200/023* (2013.01); *B01L 2200/04* (2013.01)

(56) References Cited

U.S. PATENT DOCUMENTS

| | | | |
|---|---|---|---|
| 6,715,369 | B2 | 4/2004 | Baba et al. |
| 6,931,948 | B2 | 8/2005 | Doi et al. |
| 7,105,130 | B2 | 9/2006 | Telimaa et al. |
| 7,185,551 | B2 | 3/2007 | Schwartz |
| 7,284,454 | B2 | 10/2007 | Cote |
| 7,421,913 | B2 | 9/2008 | Belgardt et al. |
| 7,434,484 | B2 | 10/2008 | Belgardt |
| 7,574,929 | B2 | 8/2009 | Telimaa et al. |
| 7,673,531 | B2 | 3/2010 | May et al. |
| 7,674,432 | B2 | 3/2010 | Wilmer |
| 7,694,592 | B2 | 4/2010 | Molitor et al. |
| 7,726,212 | B2 | 6/2010 | Magnussen et al. |
| 7,972,575 | B2 | 7/2011 | Lind |
| 8,028,592 | B2 | 10/2011 | Molitor et al. |
| 8,117,927 | B2 | 2/2012 | Millet et al. |
| 8,297,134 | B2 | 10/2012 | Wilmer |
| 8,397,593 | B2 | 3/2013 | Petrek et al. |
| 8,480,972 | B2 | 7/2013 | May et al. |
| 8,631,682 | B2 | 1/2014 | Telimaa |
| 8,632,735 | B2 | 1/2014 | Kohn et al. |
| 8,656,792 | B2 | 2/2014 | Kirste et al. |
| 8,829,473 | B1 | 9/2014 | Griswold et al. |
| 9,027,419 | B2 | 5/2015 | Wilmer et al. |
| 9,044,749 | B2 | 6/2015 | Wilmer |
| 9,084,993 | B2 | 7/2015 | Naumann et al. |
| 9,156,031 | B2 | 10/2015 | Gruner et al. |
| 9,221,046 | B2 | 12/2015 | Petrek et al. |
| 9,358,538 | B2 | 6/2016 | Beroz et al. |
| 9,393,561 | B2 | 7/2016 | Link |
| 9,440,230 | B2 | 9/2016 | Baron |
| 9,566,580 | B2 | 2/2017 | Jaaskelainen et al. |
| 9,579,644 | B2 | 2/2017 | Belgardt et al. |
| 9,623,406 | B2 | 4/2017 | Lind et al. |
| 9,804,064 | B2 | 10/2017 | Voyeux et al. |
| 9,931,627 | B2 | 4/2018 | Sanchez |
| 9,931,628 | B2 | 4/2018 | LaCroix |
| 10,029,250 | B2 | 7/2018 | Fetz et al. |
| 11,660,592 | B2 | 5/2023 | Schieffer et al. |
| 11,679,383 | B2 | 6/2023 | Schieffer et al. |
| 2005/0220676 | A1 | 10/2005 | Tran |
| 2016/0199830 | A1 * | 7/2016 | LaCroix ................ B01L 3/0217 73/864.13 |
| 2016/0279630 | A1 | 9/2016 | Fracchia et al. |
| 2017/0021348 | A1 | 1/2017 | Berghall |
| 2017/0028397 | A1 | 2/2017 | Dudek |
| 2017/0151556 | A1 | 6/2017 | Wilth et al. |
| 2017/0341072 | A1 | 11/2017 | Reichmuth et al. |
| 2018/0099270 | A1 | 4/2018 | Petrek |
| 2018/0185836 | A1 | 7/2018 | Romer et al. |
| 2018/0250667 | A1 | 9/2018 | Dudek et al. |
| 2018/0318825 | A1 | 11/2018 | Reichmuth et al. |
| 2019/0030525 | A1 | 1/2019 | Miettinen et al. |
| 2019/0083969 | A1 | 3/2019 | Schiraga et al. |
| 2019/0083970 | A1 | 3/2019 | Schiraga et al. |
| 2019/0083971 | A1 | 3/2019 | Schiraga et al. |
| 2019/0151839 | A1 | 5/2019 | Dudek et al. |
| 2021/0252497 | A1 | 8/2021 | Neese et al. |

* cited by examiner

MULTI-TIERED PIPETTE TIP HOLDER AND EJECTION MECHANISM FOR A DYNAMIC BROAD VOLUMETRIC RANGE PIPETTE

CROSS-REFERENCE TO RELATED APPLICATIONS

This application claims the benefit of the filing date of U.S. Provisional Application No. 63/402,858, filed Aug. 31, 2022, the entire contents of which is incorporated by reference herein.

FIELD OF THE INVENTION

The present invention generally relates to pipetting devices capable of dispensing liquids across a broad range of volumes. In particular, described herein is pipetting device with a multi-tiered pipette tip holder design and concentric cylinder ejection mechanism to enable the use of pipette tips of different sizes on a single device.

BACKGROUND OF THE INVENTION

Pipettes and other similar liquid dispensing devices are commonly used in laboratories and in field research for dosage of liquids. Typical pipettes include a piston movable in a cylinder and serving to aspire liquid into and dispense liquid from a disposable pipette tip attached to the dispensing end of the pipette. The liquid volume is usually adjustable. The piston is moved by manual actuation (e.g., force applied to a button) or by means of an electric motor and an associated control system. Electronic pipettes have a control system and associated user interface for setting, e.g., the volume and other necessary pipette functions and for giving commands for performing operations. When the desired function has been selected and the volume and other settings have been entered, depression of an operating switch automatically carries out the actuation of the piston.

Pipettes are commonly used to dispense volumes of liquids that are generally less than about 1 mL and in the range from about 0.5 μl to about 1 mL. However, as will be understood by the skilled artisan, current pipette technology does not allow dispensing liquid volumes across this entire range using a single fluid displacement device—at least not without sacrificing accuracy and precision. Typical wet lab work requiring the dispensing of liquids across this range will require the use of three to four different pipetting devices, each optimized for accurate and precise aspiration/dispensing of a subset of this volumetric range. For instance, a researcher will commonly use a 20 μl pipette for dispensing fluid volumes ranging from about 2 μl to about 20 μl, a 200 μl pipette for dispensing fluid volumes ranging from about 20 μl to about 200 μl, and a 1,000 μl pipette for dispensing fluid volumes ranging from about 100 μl to about 1,000 μl. Moreover, each pipette will have a tip holding portion with an outer circumferential diameter particularly suitable for the attachment of disposable pipette tips of a certain size (and volumetric capacity). Having to use multiple devices leads to cluttering of the work area and drives up costs. As such, not only must pipetting devices be designed for accurate volumetric range aspiration of liquids, but such a pipette will need to be able to accommodate pipette tips of different sizes to achieve accurate and precise broad volumetric range capabilities in a single device.

There is a need, therefore, for a single pipetting device capable of using pipette tips of different sizes to ensure accuracy and precision of transferring liquids across a broad range of volumes.

SUMMARY OF THE INVENTION

Described herein is a broad volumetric range pipetting device with a multi-tiered pipette tip holder and concentric cylinder pipette tip ejection design. In particular, the device disclosed herein preferably employs a dispensing unit portion comprised of two or more cylindrical housings disposed over the chamber cylinder that contains the piston and vacuum chamber. Each cylinder or cylindrical housing will taper slightly near the bottom end, and each cylinder will preferably have an inner diameter that is at least slightly larger than the outer circumferential diameter of the adjacent cylinder over which it is disposed (i.e., a concentric arrangement) and be configured for movement along the axis of the adjacent inner cylinder (i.e., movement up and down in relation to the adjacent inner cylinder). In addition, the inner cylinders will tend to extend beyond the bottom edge of the adjacent outer cylinder to provide for a pipette tip attachment surface. In this manner, the concentric arrangement of cylinders provides for a multi-tiered pipette tip holder surface for attachment of pipette tips having different sizes—the cylinders with the smaller outer circumferential diameters configured for attachment of smaller pipette tips, and the cylinders with the larger outer circumferential diameters configured for attachment of larger pipette tips. Further, the bottom edge of each outer cylinder can contact and dislodge a pipette tip attached to the tip holding portion of the adjacent inner cylinder over which it is disposed. Further, the pipetting device will include an ejector element that can be used to apply force to the concentric cylinders and eject the pipette tips. In some embodiments, the pipetting device also includes a locking mechanism to prevent contamination of the dispensing end when certain pipette tips are being used.

In one aspect, the invention features a pipette with a multi-tiered pipette tip holder and ejection mechanism. The device includes a pipette body with an upper drive unit section and a lower dispensing section. On the lower dispensing section is a small tip holder portion and a chamber cylinder with a fluid inlet to enable fluid to be drawn into the chamber cylinder or discharged therefrom. The device also includes an ejection assembly comprising an ejector element, ejection rod, a first dispenser cylinder having a large tip holder portion and a small tip ejection edge, and a second dispenser cylinder having a large tip ejection edge. The first dispensing cylinder is disposed over the chamber cylinder and configured to move up and down in relation to the chamber cylinder, while the second dispensing cylinder is disposed over the first dispensing cylinder and configured to move up and down in relation to the first dispensing cylinder. In this aspect, the ejection rod is configured to contact the second dispensing cylinder and move the second dispensing cylinder to a first position wherein the large tip ejection edge contacts and ejects a large pipette tip from the large tip holder portion when a first force is applied to the ejector element, or cause the first dispensing cylinder to move to a second position wherein the small tip ejection edge contacts and ejects a small pipette tip from the small tip holder portion with a second force is applied to the ejector element. In an embodiment, the fluid is air.

In one embodiment, the pipette further includes a biasing element disposed circumferentially around a portion of the ejection rod and configured to bias the ejection rod in an upwards position. In another embodiment, the large tip holder portion has an outer diameter that is greater than the outer diameter of the small tip holder portion. In a preferred embodiment, the ejector element is disposed on the upper drive unit section.

In some embodiments, the pipette includes a first ejector member connected to the first dispensing cylinder, and both a second ejector member and the ejection rod connected to the second dispensing cylinder such that the second ejector member can contact and move the first ejector member to the second position when the second force is applied to the ejector element. In another embodiment, the first ejector member and second ejector member are positioned within the upper drive unit section with the first dispensing cylinder and second dispensing cylinder forming part of the lower dispensing section.

In some aspects, the pipette also includes a piston slidably positionable within the chamber cylinder between an open position and a closed position, and a motor disposed within the upper drive unit portion and operably connected to the piston and configured to actuate the piston between the open position and the closed position within the chamber cylinder. Accordingly, the actuation of the piston to the open position defines a liquid volume to be aspirated by the pipette in an amount approximately equivalent to a fluid volume displaced by the movement of the piston. In yet other embodiments, the small tip holder portion is configured for attachment of a pipette tip having a maximum liquid capacity in the range from about 2 µl to about 200 µl; preferably, about 20 µl to about 200 µl. In still other embodiments, the large tip holder portion is configured for attachment of a pipette tip having a maximum liquid capacity in the range from about 200 µl to about 5,000 µl; preferably, about 200 µl to about 1,000 µl.

In another embodiment, the pipette further includes a locking mechanism comprising a trigger, biasing element, and locking rod movable between a locking position and unlocking position. The movement of the second dispensing cylinder and first dispensing cylinder to the second position causes the locking rod to move to the locking position and prevent upwards movement of the first dispensing cylinder. Further, the force applied to the trigger against the biasing element causes the locking rod to move to the unlocking position whereby the locking rod no longer prevents upwards movement of the first dispensing cylinder. In one embodiment, the locking rod contacts a bottom side of the trigger when in the locking position.

In other embodiments, the pipette further includes a printed control board for controlling the motor in response to an end-user volume input and a sensor in electronic communication with a printed control board. In this embodiment, the sensor is configured to detect when the first dispensing cylinder is unlocked and prevents the motor from causing the piston to move upwards to the open position to the extent that it defines a liquid volume to be aspirated by the pipette that exceeds the maximum liquid capacity of a small pipette tip. The sensor can also detect when the first dispensing cylinder is locked and allows the motor to cause the piston to move upwards to the open position to the extent that it defines a liquid volume to be aspirated by the pipette that exceeds the maximum liquid capacity of a small pipette tip.

Another aspect of the invention features a method of replacing a pipette tip on the pipette described above that includes the step of applying force to the ejector element until the small tip ejection edge contacts and dislodges the small pipette tip from the small tip holder portion or applying force to the ejector element until the large tip ejection edge contacts and dislodges the large pipette tip from the large tip holder portion, depending on whether a small pipette tip or a large pipette tip is attached to the corresponding tip holder portion. In one embodiment, the method includes the step of inserting the small tip holder portion into a pipette receiving end of a small pipette tip so as to create an interference fit. In another embodiment, the method includes the step of inserting the large tip holder portion into a pipette receiving end of a large pipette tip so as to create an interference fit. In yet another embodiment, the method includes the step of holding the trigger down when applying force to the ejector element.

Another aspect of the invention features a pipetting device with a multi-tiered pipette tip holder and ejection mechanism that includes an elongated pipette body comprising an air inlet at a dispensing end, an ejector element, and a concentric cylinder assembly. The concentric cylinder assembly includes a chamber cylinder in fluid communication with the fluid inlet, a small tip ejection cylinder having a small tip ejection edge and a large tip holder portion, and a cylindrical dispenser housing having a large tip ejection edge. Further, the chamber cylinder is concentrically received within the small tip ejection cylinder, the small tip ejection cylinder is concentrically received within the cylindrical dispenser housing and configured to move up and down in relation to the chamber cylinder, and the cylindrical dispenser housing is configured to move up and down in relation to the small tip ejection cylinder. In this aspect, the pipetting device also includes an ejection rod in mechanical communication with the ejector element and configured to cause the cylindrical dispenser housing to move to a first position wherein the large tip ejection edge contacts and ejects a large pipette tip from the large tip holder portion when a first force is applied to the ejector element, or cause the small tip ejection cylinder to move to a second position wherein the small tip ejection edge contacts and ejects a small pipette tip from the small tip holder portion with a second force is applied to the ejector element.

In one embodiment, the pipetting device also includes a first ejection member connected to the small tip ejection cylinder, and a second ejection member connected to the ejection rod and to the cylindrical dispenser housing. As such, the ejection rod moves the second ejection member and the cylindrical dispenser housing to the first position when a first force is applied to the ejector element, or the ejection rod causes the second ejection member to contact and move the first ejection member and small tip ejection cylinder to the second position when the second force is applied to the ejector element. In another embodiment, the pipetting device includes a locking mechanism comprising a trigger, biasing element, and locking rod movable between a locking and unlocking position. The movement of the cylindrical dispenser housing and small tip ejection cylinder to the second position causes the locking rod to move to the locking position and prevent upwards movement of the small tip ejection cylinder.

In another embodiment, force applied to the trigger against the biasing element causes the locking rod to move to the unlocking position whereby the locking rod no longer prevents upwards movement of the small tip ejection cylinder. In yet another embodiment, the locking rod contacts a bottom side of the trigger when in the locking position.

In some embodiments, the pipetting device includes a piston slidably positionable within the chamber cylinder between an open position and a closed position and a motor operably connected to the piston and configured to actuate the piston between the open position and the closed position within the chamber cylinder. As such, the actuation of the piston to the open position defines a liquid volume to be aspirated by the pipette in an amount approximately equivalent to a fluid volume displaced by the movement of the piston. In one embodiment, the motor is mechanically connected to a threaded piston, wherein the threaded piston is connected to the piston by one or more magnets. In another embodiment, the pipetting device may include a printed control board for controlling the motor in response to an end-user volume input and a sensor in electronic communication with a printed control board, such that the sensor detects: (i) when the small tip ejection cylinder is unlocked and prevents the motor from causing the piston to move upwards to the open position to the extent that it defines a liquid volume to be aspirated by the pipette that exceeds the maximum liquid capacity of a small pipette tip; and/or (ii) when the small tip ejection cylinder is locked and allows the motor to cause the piston to move upwards to the open position to the extent that it defines a liquid volume to be aspirated by the pipette that exceeds the maximum liquid capacity of a small pipette tip.

Other features and advantages of the invention will be apparent by reference to the drawings, detailed description, and examples that follow.

BRIEF DESCRIPTION OF THE DRAWINGS

FIG. 211 depicts an internal view of an exemplary ejection mechanism and locking mechanism with the locking mechanism engaged.

FIG. 21 depicts a bottom perspective internal view of an exemplary ejection mechanism and locking mechanism with the locking mechanism engaged.

DETAILED DESCRIPTION OF THE INVENTION

Figure 1:
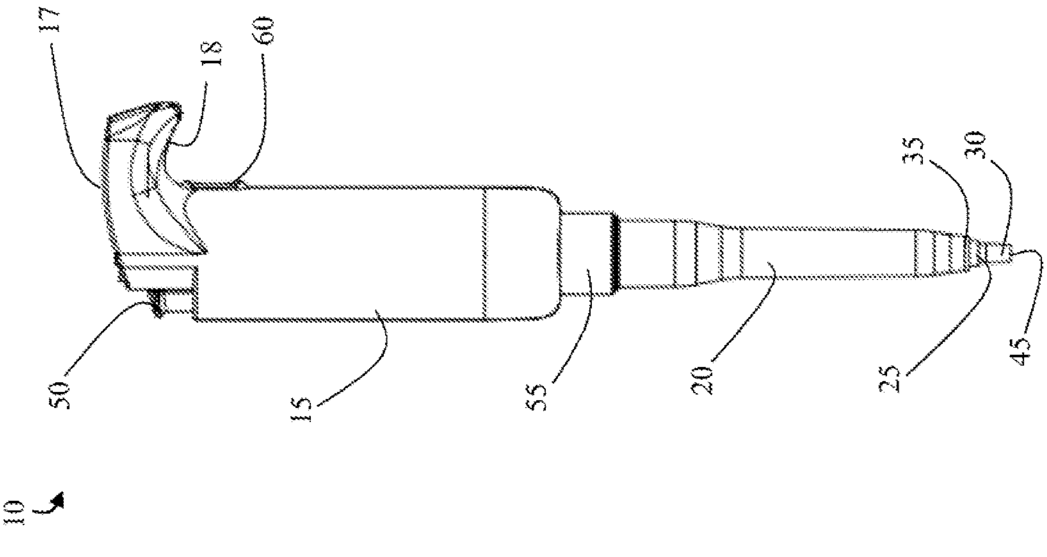
FIG. 1 depicts a side view of an embodiment of the pipetting device described herein.

The pipetting devices described herein utilize a multi-tiered pipette tip holder and ejection assembly to enable the use of different sized pipette tips with a single pipette, which, in turn, enables the accurate and precise transfer of a large range of liquid volumes. The multi-tiered pipette tip holder and ejection assembly includes a dispensing unit with a nested, concentric cylinder design. In general, the innermost cylinder will typically be a chamber cylinder containing the vacuum chamber and piston for causing the aspiration of liquids. Connected to the bottom (or integral with the chamber cylinder) will be the dispensing end of the pipetting device, which would also include the small tip holder portion. Next, two or more cylinders will be disposed over the chamber cylinder and small tip holder portion in a concentric arrangement with inner cylinder extending beyond the bottom edge of the immediately adjacent outer cylinder to provide a pipette tip attachment portion or surface. As such, it is preferable that each adjacent outer cylinder have an inner diameter that is slightly larger than the outer circumferential diameter of the adjacent inner cylinder. Moreover, each outer cylinder will be configured to move up and down in relation to the immediately adjacent inner cylinder, and each outer cylinder will preferably have a bottom edge to serve as an ejection edge to dislodge a pipette tip from the tip holder portion of the immediately adjacent inner cylinder.

An ejector element and rod mechanism may be incorporated to enable the end-user to manually or, via a motor-controlled actuator mechanism, apply downward force on one or more of the ejector cylinders to eject a small or large pipette tip. In this manner, the multi-tiered, concentric cylinder design enables the use of both small and large pipette tips on a single pipetting device and allows ease of ejection from the multi-tiered pipette tip attachment portion. Further, a locking mechanism can be incorporated into the design to maintain the large tip holder cylinder in the downward position and reduce the extension of the small tip holder beyond the small tip ejection edge of the large tip holder cylinder thereby enabling attachment of a large pipette tip while minimizing or eliminating the potential for contamination with the liquid being aspirated. The pipetting device and ejection assembly is described in detail below.

Unless defined otherwise, all technical and scientific terms used herein have the same meaning as those commonly understood by one of ordinary skill in the art to which this invention belongs. Standard techniques are used unless otherwise specified. Although methods and materials similar or equivalent to those described herein can be used in the practice or testing of the present disclosure, suitable methods and materials are described below. The materials, methods and examples are illustrative only, and are not intended to be limiting. All publications, patents and other documents mentioned herein are incorporated by reference in their entirety.

As used herein, the singular forms “a,” “an,” and “the” include the plural referents unless the context clearly indicates otherwise.

The term "about" refers to the variation in the numerical value of a measurement, e.g., diameter, area, length, volume, etc., due to typical error rates of the device used to obtain that measure. In one embodiment, the term "about" means within 5% of the reported numerical value.

The term "approximately equivalent" is used herein to refer to the volume of fluid displaced by the device as compared to the volume of liquid aspirated by the device and means that the volume of fluid (e.g., air) displaced by movement of the plunger element within the vacuum chamber is not exactly equal to the volume of liquid aspirated into the tip attached to the end of the device due to the difference between the density of the fluid and the density of the liquid. The device design is calibrated taking into account this factor and is well within the purview of the skilled artisan.

The terms "interference fit" or "friction fit" are used interchangeably herein and refer to a fastening between two parts that is achieved by friction after the parts are pushed together.

The designations "up" and "down," "upward" and "downward," and "horizontal" and "vertical" as used herein refer to an orientation of the pipette device in which the pipette housing and dispenser portion are oriented with the actuating element or handle at the top and the dispensing end at the bottom (see, e.g., FIG. 1). In this orientation, a pipette tip fastened or attached onto the dispensing end of the pipetting device can be directed towards a vessel situated thereunder, in order to aspirate or deliver a liquid.

The terms "outer diameter" or "outer circumferential diameter" are used herein to refer to the diameter across a cylindrical component measured from one point on the outer surface of the cylinder wall to another point on the outer surface of the cylinder wall. The term "inner diameter" is used herein to refer to the diameter across a cylindrical component measured from one point on the inner surface of the cylinder wall to another point on the inner surface of the cylinder wall.

Air-displacement style pipettes are commonly used in the art. While the exemplary embodiments described herein disclose a single piston and motor driven air-displacement pipetting device, other pipette designs, such as a dual motor nested plunger design and manually-operated plunger designs, can be adapted for use with the pipette tip ejection assembly and locking mechanism. As will be understood in the art, the single piston air-displacement design utilizes the movement of a piston within a cylindrical vacuum chamber to enable the aspiration and dispensing of liquid volumes. In general, a disposable pipette tip of the appropriate size is attached to the dispensing end of the pipetting device. The end of the pipette tip can then be placed in a liquid to be transferred. Movement of the piston upwards within the vacuum chamber expands the size of the chamber thereby creating a vacuum that causes an influx of fluid (e.g., air). This fluid displacement facilitates the aspiration of an approximate equivalent volume of liquid into the attached pipette tip. Movement of the piston downwards within the vacuum chamber then forces the fluid (e.g., air) out of the chamber and causes dispensing of the liquid out of the pipette tip. By precisely controlling the movement of the piston within the vacuum chamber, the end-user can precisely and accurately control the volume of liquid being transferred. However, to better ensure accuracy and precision of the liquid being transferred, disposable pipette tips having the appropriate volumetric capacity need to be selected for use. Larger pipette tips capable of accurately transferring larger volumes of liquid will tend to have a larger attachment circumference than pipette tips optimized for the transfer of smaller volumes of liquid thus highlighting the need for pipetting device dimensions capable of attaching a large range of pipette sizes.

Exemplary pipetting device designs are shown in FIGS. 1-4. While the piston-driven air-displacement pipette design shown in the drawings is capable of a broad volumetric range (e.g., from about 1 μl to about 1,000 μl), such a broad volumetric range will require the use of both small disposable pipette tips (e.g., with maximum liquid transfer capacities of up to about 5 μl, 20 μl, 100 μl, or 200 μl) and large disposable pipette tips (e.g., with a maximum liquid transfer capacity of up to about 1,000 μl). As one having ordinary skill in the art will recognize, the small pipette tips will require a tip holder circumference for interference/friction fit that is smaller than the tip holder circumference required for the attachment of large pipette tips. As such, provided herein is a concentric cylinder design where the increasing outer circumferential diameters of the successive cylinders create a multi-tiered tip holding system with each successive cylinder having a larger outer circumferential diameter for attaching larger pipette tips. These attachment portions or seats preferably are designed to have an outer diameter of the appropriate size to enable a sufficient interference fit for either small pipette tips or large pipette tips. In a preferred embodiment, each of the small tip holder and larger tip holder will taper slightly from the top portion to the bottom portion to enable ease of attachment by insertion of the tip holder into the open end of a disposable pipette tip. As disposable pipette tips of standard sizes are well known in the art, the design of the small tip holder and large tip holder shape and size to enable optimal attachment of the appropriate pipette tip is well within the purview of the skilled artisan.

For instance, a small tip holder portion suitable for attachment of a small pipette tip may have an outer diameter that tapers from about 5 mm to about 6 mm (preferably, from about 5.2 mm to about 5.6 mm) at the top portion down to about 4 mm to about 5.2 mm (preferably, from about 4.7 mm to about 5.1 mm) at the bottom portion. In an exemplary embodiment, the large tip holder portion suitable for attachment of a large pipette tip may have an outer diameter that tapers from about 7.5 mm to about 8.5 mm (preferably, from about 7.5 mm to about 7.8 mm) at the top portion down to about 6.5 mm to about 8 mm (preferably, from about 7 mm to about 7.5 mm) at the bottom portion. For instance, the exemplary embodiment depicted in the examples has a small tip holder portion having an outer diameter of about 5.6 mm at the top portion that tapers to about 4.9 mm at the bottom portion, whereas the large tip holder portion has an outer diameter of about 8.06 mm at the top portion that tapers to about 7.3 mm at the bottom portion. A suitable fluid opening at the dispensing end of the device may have a diameter ranging from about 1.3 mm to about 2 mm (preferably, from about 1.5 mm to about 1.8 mm). The multi-tiered arrangement of concentric cylinders provide pipette tip attachment portions or seats suitable for accommodating different sized pipette tips.

The small tip holder portion is suitable for attachment of a small disposable pipette tip having a maximum liquid transfer capacity of about 2 μl to about 200 μl, e.g., 2 μl, 5 μl, 10 μl, 20 μl, 100 μl, or 200 μl; or the small tip will have a maximum liquid transfer capacity of about 20 μl to about 200 μl. The large tip holder portion is suitable for attachment of a large disposable pipette tip having a maximum liquid transfer capacity of about 200 μl to about 5,000 μl; preferably, between about 200 μl about 1,000, e.g., 200 μl, 500 μl, or 1,000 μl.

In other embodiments, the outer diameter of the large tip holder and/or the outer diameter of the small tip holder can be designed to accommodate disposable pipette tips having a maximum liquid transfer capacity greater than 1,000 μl or a maximum liquid transfer capacity less than 2 μl, respectively. For instance, the outer diameter of the large tip holder can be increased to a diameter suitable for accommodating disposable pipette tips having a maximum liquid transfer capacity of about 1,000 μl to about 5,000 μl, e.g., 1,000 μl, 1,500 μl, 2,000 μl, 2,500 μl, 3,000 μl, 3,500 μl, 4,000 μl, 4,500 μl, or 5,000 μl (e.g., a P5,000 disposable pipette tip). Likewise, the outer diameter of the small tip holder can be decreased to a diameter suitable for accommodating disposable pipette tips having a maximum liquid transfer capacity of equal to or less than about 2 μl, or equal to or less than about 1 μl (e.g., P2 disposable pipette tip). Alternatively, rather than altering the outer diameter of the large tip holder and/or small tip holder, tip holders of larger or small outer diameters can be added to the multi-tier tip holder design to provide an even greater range of pipette tip sizes that can be accommodated.

In a preferred design, a large tip cylinder (also referred to as the small tip ejection cylinder or first dispenser cylinder) will have an inner diameter that is at least slightly larger than the outer circumferential diameter of the chamber cylinder and will be disposed over the chamber cylinder. The large tip cylinder will function to provide the attachment surface for the large pipette tip as well as the ejection edge for a small pipette tip. The chamber cylinder includes, or is attached to, a small tip holder portion suitable for attaching small pipette tips to the dispensing end of the pipetting device. In this arrangement, the small tip holder portion will extend or protrude beyond the ejection edge of the large tip cylinder. At its farthest, the small tip holder portion may extend or protrude beyond the ejection edge of the large tip cylinder by about 5 mm to about 10 mm, e.g., 5 mm, 5.1 mm, 5.2 mm, 5.3 mm, 5.4 mm, 5.5 mm, 5.6 mm, 5.7 mm, 5.8 mm, 5.9 mm, 6 mm, 6.1 mm, 6.2 mm, 6.3 mm, 6.4 mm, 6.5 mm, 6.6 mm, 6.7 mm, 6.8 mm, 6.9 mm, 7 mm, 7.1 mm, 7.2 mm, 7.3 mm, 7.4 mm, 7.5 mm, 7.6 mm, 7.7 mm, 7.8 mm, 7.9 mm, 8 mm, 8.1 mm, 8.2 mm, 8.3 mm, 8.4 mm, 8.5 mm, 8.6 mm, 8.7 mm, 8.8 mm, 8.9 mm, 9 mm, 9.1 mm, 9.2 mm, 9.3 mm, 9.4 mm, 9.5 mm, 9.6 mm, 9.7 mm, 9.8 mm, 9.9 mm, or 10 mm; preferably, it extends or protrudes beyond the ejection edge of the large tip cylinder by about 6 mm to about 9 mm. In one exemplary embodiment, the small tip holder portion may extend or protrude beyond the ejection edge of the large tip cylinder by about 9 mm. Since the large tip cylinder is disposed over the chamber cylinder and configured to move parallel along the vertical axis of and in relation to the chamber cylinder (i.e., up and down), when force is applied to the ejection element and rod mechanism, the large tip cylinder will be moved downward such that the small tip ejection edge will contact and dislodge a small pipette tip if a small pipette tip is attached to the small tip holder portion.

The next cylinder in the arrangement is the cylindrical dispenser housing (or second dispenser cylinder), which will have an inner diameter that is at least slightly larger than the outer circumferential diameter of the large tip cylinder and will be disposed over the large tip cylinder and configured to move parallel along the vertical axis of and in relation to the large tip cylinder (i.e., up and down). The cylindrical dispenser housing will have a large tip ejection edge. Since the cylindrical dispenser housing is disposed over the large tip cylinder and configured to move up and down in relation to the large tip cylinder, when force is applied to the ejection element and rod mechanism, the cylindrical dispenser housing will be moved downward such that the large tip ejection edge will contact and dislodge a large pipette tip if a large pipette tip is attached to the large tip holder portion.

The pipetting devices described herein may also have a locking mechanism for preventing upwards movement of the large tip cylinder (i.e., locking the large tip cylinder into the downward position) when large pipette tips are to be used. This locking mechanism reduces the length of the chamber cylinder and small tip holder portion that will extend or protrude beyond the small tip ejection edge of the large tip cylinder. In the locked position, the small tip holder portion may extend or protrude beyond the ejection edge of the large tip cylinder by about 0 mm to about 3 mm, e.g., 0 mm, 0.1 mm, 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2 mm, 2.1 mm, 2.2 mm, 2.3 mm, 2.4 mm, 2.5 mm, 2.6 mm, 2.7 mm, 2.8 mm, 2.9 mm, or 3 mm; preferably, it extends or protrudes beyond the ejection edge of the large tip cylinder by about 0 mm to about 1.5 mm. In one exemplary embodiment, when in the locked position, the small tip holder portion may extend or protrude beyond the ejection edge of the large tip cylinder by about 1.3 mm. Thus, when a large pipette tip or large filtered pipette tip is attached to the large tip holder portion, there is reduced risk of contaminating the dispenser opening of the pipetting device as liquid is drawn up into the large pipette tip. Moreover, this locking design will allow the attachment of large, filtered pipette tips as the extension of the small tip holder portion will not contact the filter component and prevent secure interference fit of the large, filtered pipette tip to the large tip holder portion.

An exemplary embodiment of the multi-tiered, concentric pipette tip holder and ejection design on a pipetting device is depicted in FIGS. 1-4. While a single piston, air-displacement type pipetting device is shown, the ejector mechanism described herein can be adapted for use with many other types of pipetting devices available in the art, such as concentric, dual-piston designs and others. Moreover, manually-operated piston designs are also suitable. As shown in FIG. 1, the pipetting device 10 generally has an elongated or rod-like shape with a top, upper drive unit section that contains the drive unit and all of the associated components encased in a pipette housing 15. The pipetting device 10 also generally includes a bottom, lower fluid displacement and dispensing section, which includes a cylindrical dispenser housing 20 disposed over two or more inner cylinders and majority of the dispensing components. In particular, the dispensing section of the pipetting device 10 is comprised of concentric cylinders or housings that work in cooperation to form the multi-tiered pipette tip attachment portions and tip ejector mechanism as will be explained in detail below. The dispensing section has an opening 45 at the dispensing end, a large tip holder 25, and a small tip holder 30. As shown in FIG. 3A, the large tip holder 25 is part of the bottom portion of the large tip cylinder bottom 65 closest the opening 45, and the small tip holder 30 is attached to the end of the chamber cylinder 70. The dispenser housing 20, large tip cylinder 65, and small tip holder 30/chamber cylinder 70 form a concentric cylinder configuration such that the large tip holder 25 extends from the dispenser housing 20 beyond the large tip ejection edge 35, and the small tip holder 30 extends from the large tip cylinder 65 beyond the small tip ejection edge 40 as shown in, e.g., FIG. 1. This forms a multi-tiered tip holder design, where the outer circumference of the device at the large tip holder 25 is larger than the outer circumference at the small tip holder 30. The tiered design allows for fitting or fastening of tips of different sizes via interference or friction fit, which exploits the circular force of the pipette tip against the tip holder portion of the pipetting device to secure a large pipette tip (e.g., a 1,000 ul pipette tip) onto the large tip holder 25 or a small tip (e.g., 10 ul, 20 ul, 100 ul, or 200 ul pipette tip) onto the small tip holder 30. Thus, the pipetting device 10 is capable of aspirating and dispensing a liquid in a range of volumes from between about 0.1 µl to about 1,500 µl, e.g., about 0.1 µl, 0.2 µl, 0.3 µl, 0.4 µl, 0.5 µl, 1.0 µl, 1.5 µl, 2.0 µl, 2.5 µl, 3.0 µl, 4.5 µl, 5.0 µl, 10 µl, 15 µl, 20 µl, 25 µl, 30 µl, 40 µl, 50 µl, 60 µl, 70 µl, 80 µl, 90 µl, 100 µl, 110 µl, 120 µl, 130 µl, 140 µl, 150 µl, 160 µl, 170 µl, 180 µl, 190 µl, 200 µl, 210 µl, 220 µl, 230 µl, 240 µl, 250 µl, 260 µl, 270 µl, 280 µl, 290 µl, 300 µl, 350 µl, 400 µl, 450 µl, 500 µl, 550 µl, 600 µl, 650 µl, 700 µl, 750 µl, 800 µl, 850 µl, 900 µl, 950 µl, 1,000 µl, 1,100 µl, 1,200 µl, 1,300 µl, 1,400 µl, or 1,500 µl. In a particular embodiment, the pipetting device 10 is capable of aspirating and dispensing a liquid in the range of volumes from between about 0.5 µl and about 1,000 µl.

As one having ordinary skill in the art will appreciate, typical pipettes utilize disposable pipette tips and must be quickly removed and replaced in between the handling of different liquid samples to prevent contamination or unwanted mixture of liquids. Thus, ejector mechanism of the instant disclosure utilizes the concentric cylinder design for quickly and easily removing both large and small pipette tips without the user having to touch the tips themselves.

Both the dispenser housing 20 and the large tip cylinder 65 have ejection edges at the end closes to the opening 45—the large tip ejection edge 35 and small tip ejection edge 40, respectively. The pipetting device 10 includes an ejector element 50 at the top of the device that can be pressed downward to activate the pipette tip ejection mechanism. As the user pushes down on the ejector element 50, the dispenser housing 20 moves downwards in relation to the large tip cylinder 65, large tip holder 25, and small tip holder 30. The large tip ejection edge 35 will contact and dislodge any large pipette tip that is attached to the large tip holder 25. As the user continues to push down the ejector element 50, both the dispenser housing 20 and the large tip cylinder bottom move downwards in relation to the small tip holder 30. The small tip ejection edge 40 will contact and dislodge any small pipette tip that is attached to the small tip holder 30. While the ejection mechanism in this embodiment is manually-operated, motor-driven designs are also contemplated and work in a similar manner.

Figure 2A:
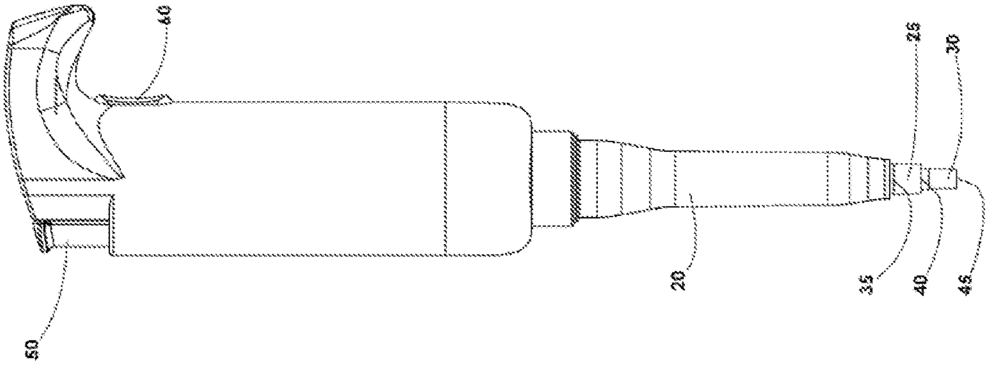
FIG. 2A depicts a side view of an embodiment of the pipetting device with the locking mechanism disengaged for small pipette tip attachment.
Figure 2B:
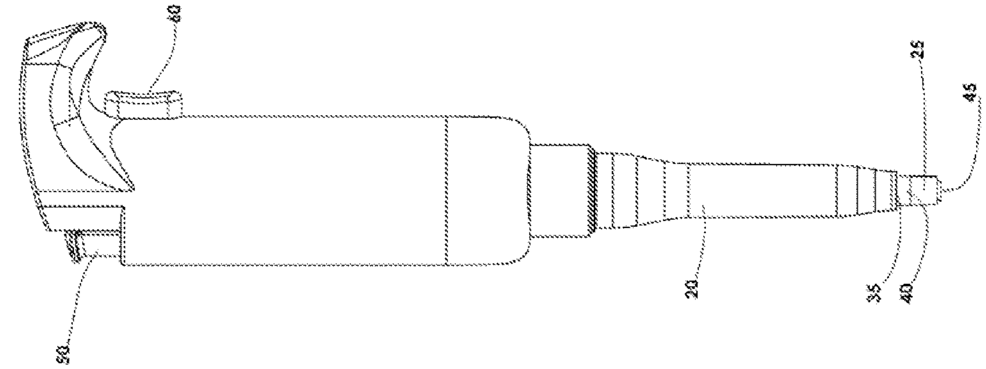
FIG. 2B depicts a side view of an embodiment of the pipetting device with the locking mechanism engaged for large pipette tip attachment.
Figure 2C:
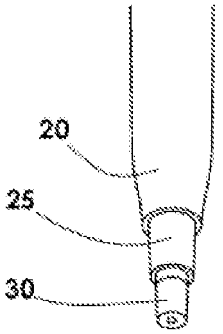
FIG. 2C depicts a close-up view of the pipette dispensing end with the locking mechanism disengaged for small pipette tip attachment.
Figure 2E:
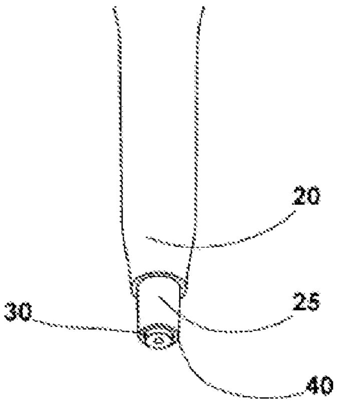
FIG. 2E depicts a close-up view of the pipette dispensing end with the locking mechanism engaged for large pipette tip attachment.
Figure 2D:
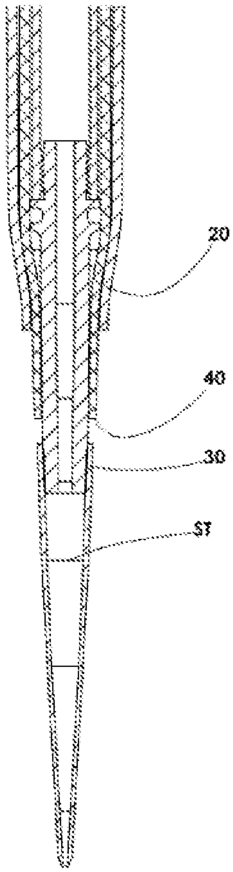
FIG. 2D depicts a close-up view of a small pipette tip attached to the small tip holder portion.

As shown in FIG. 2A, the small tip holder 30 extends beyond the small tip ejection edge 40 of the large tip cylinder 65 (i.e., by about 9 mm) thereby providing an attachment surface for a small pipette tip to be securely attached to the small tip holder 30. FIG. 2C and FIG. 2D depict close-up views of the small tip holder 30. A small tip ST is attached to the small tip holder 30 by interference fit (see FIG. 2D). When the end-user aspirates liquid and wishes to change the tip, the ejector element 50 is manually (or, in alternative embodiments, electronically by a motor) moved downwards, which moves the dispenser housing 20 downward. As the dispenser housing is continued to be moved downward, the large tip cylinder 65 is then also moved downward as the small tip ejection edge 40 contacts the small pipette tip ST and dislodges the small pipette top ST from the small tip holder 30. As shown in FIG. 2B and FIG. 2E, the small tip holder 30 now extends only slightly beyond the small tip ejection edge 40 (i.e., by about 1.3 mm, or less) as compared to when the large tip cylinder 65 is in the upward position. In some embodiments, when in the locked position, the small tip holder 30 extends beyond the small tip ejection edge 40 by between about 0 mm to about 3 mm; preferably, less than about 2 mm; more preferably, less than about 1.3 mm.

Figure 2F:
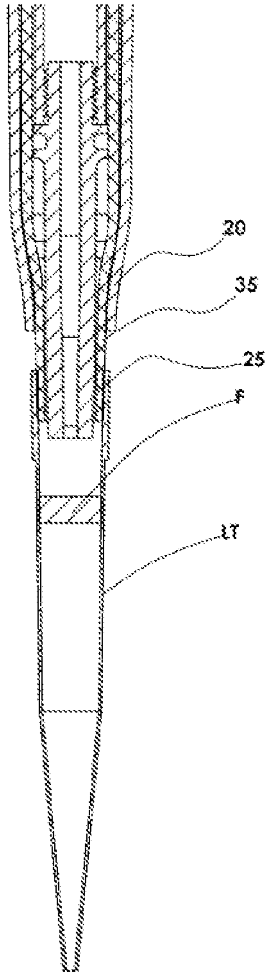
FIG. 2F depicts a close-up view of a large pipette tip attached to the large tip holder portion of the large tip cylinder.

The ejector mechanism of the invention may also include a locking mechanism that is configured to maintain the large tip cylinder 65 in the downward position. In this manner, the small tip holder 30 will no longer extend significantly beyond the small tip ejection edge 40 (see FIG. 2E). The extension of the small tip holder 30 may contact the liquid being aspirated when a large tip is attached to the large tip holder 25 (for example, if a large volume of liquid is being aspirated) or prevent attachment of large pipette tips containing filter components. To solve this problem, the locking mechanism is configured to maintain the large tip cylinder 65 in the downward position. As shown in FIG. 2F, a large, filtered pipette tip ST can now be attached to the large tip holder 25 without the small tip holder 30 being an impediment. When the end-user wishes to switch back to using small pipette tips, the locking trigger 60 is pressed, which releases the large tip cylinder 65 back to the upward position (see FIG. 2A and FIG. 2C). In this manner, the end-user can easily switch from using large pipette tips to small pipette tips, and from small pipette tips to large pipette tips by using the locking trigger 60.

FIGS. 3A-3F depict various exploded views of an exemplary pipetting device that includes both the ejection mechanism and locking mechanism. Part of the pipette housing 15 is removed to reveal the drive section components. FIGS. 3A-3F also reveal the various dispensing section components. The motor 80 is powered by rechargeable battery 90, controlled by the printed circuit board 95, and disposed on a motor holder 85. The motor 80 moves a threaded piston rod 155 and piston 115. The threaded piston rod 155 is connected to the piston 115 by way of a pair of magnets 130 that compensate for misalignment of the system, it being understood, however, that other embodiments may not require the magnets. In this particular embodiment, the motor 80 is a stepper motor. However, other suitable motors can include servo motors, DC motors, or other linear actuator-type motors. As shown in the drawings, the pair of magnets 130 are connected to the threaded piston rod 155 by the top magnet holder 125 and to the piston 115 by the bottom magnet holder 135. The exemplary magnets may be made from any suitable material, such as, but not limited to, any type of neodymium, while the magnet holders may be made of magnetic or non-magnetic materials including, but not limited to, steel, stainless steel, aluminum, plastic, and the like. The motor 80 moves the piston 115 up and down with the chamber cylinder 70. As the piston 115 is moved upwards within the chamber cylinder 70, a vacuum is created that forces air into the dispensing unit of the device, which, in turn, forces liquid into the pipette tip attached to the pipetting device. As the piston 115 is moved downwards within the chamber cylinder 70, air is forced out of the dispensing unit, which, in turn, forces the liquid out of the pipette tip. The chamber cylinder 70 is attached to the bottom of the motor holder 85 by mating threads 87, 72. Further, an O-ring 120 may be included to create an airtight seal between the piston 115 and the chamber cylinder 70 to prevent air from escaping as the piston 115 is moved up and down. The small tip holder 30 is attached to the bottom of the chamber cylinder 70 by threads 74. Another O-ring 75 can be included to create an airtight seal between the small tip holder 30 and the large tip cylinder bottom 65.

Figure 3A:
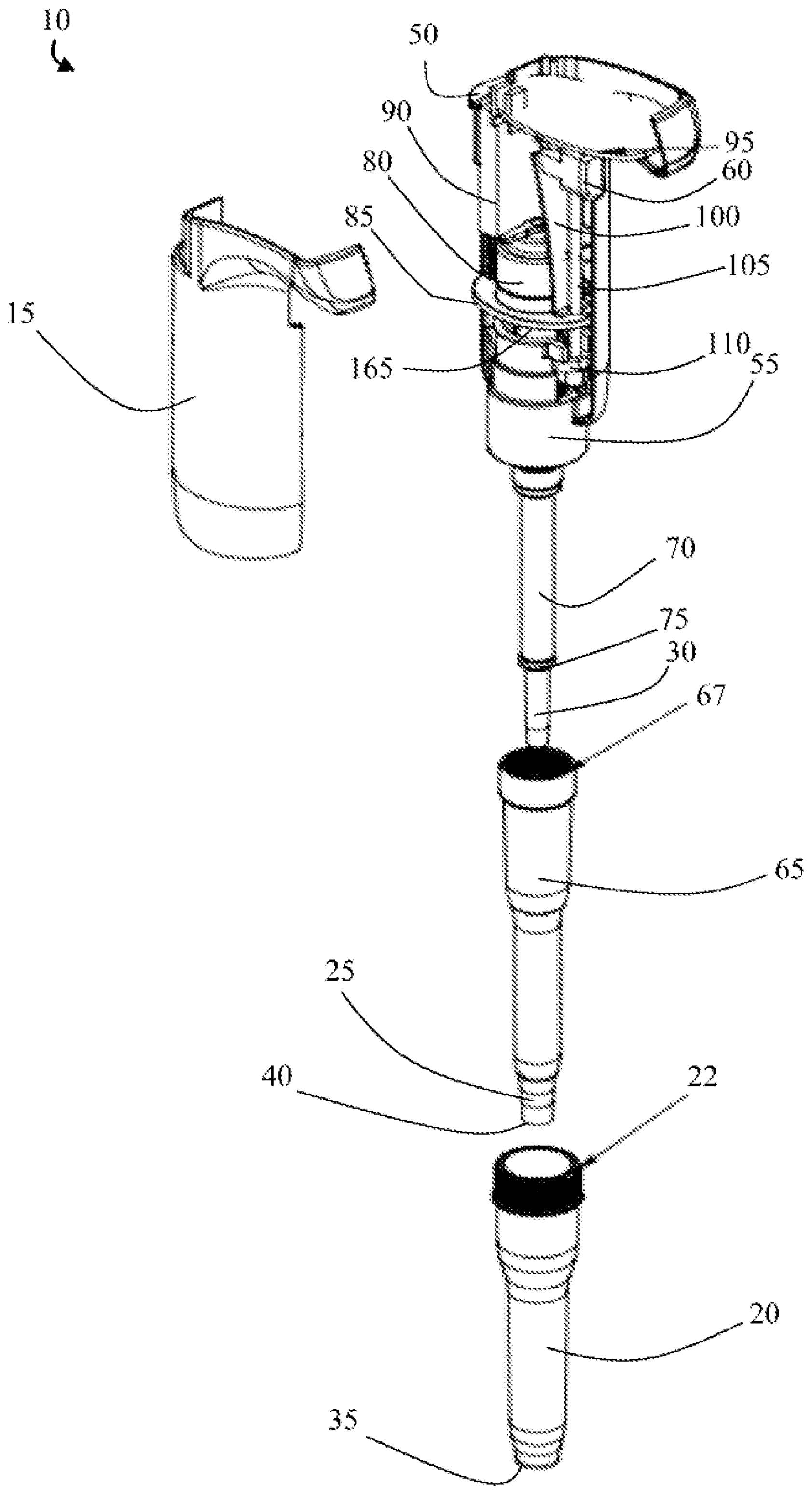
FIG. 3A is an exploded view of an exemplary pipetting device.
Figure 3C:
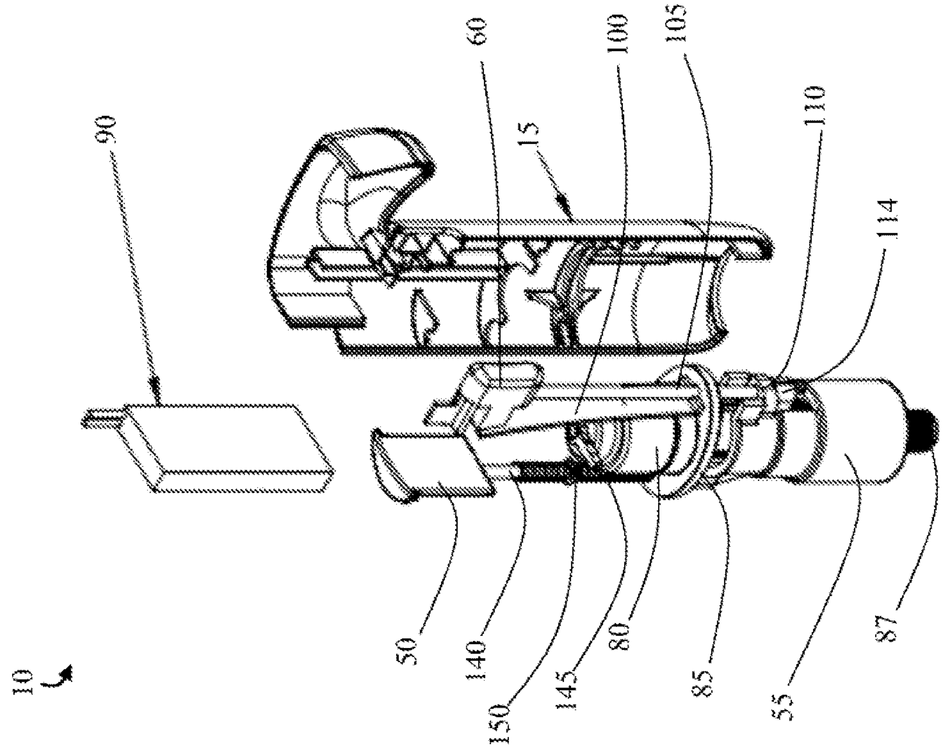
FIG. 3C is an exploded view of the drive unit of an exemplary pipetting device.
Figure 3B:
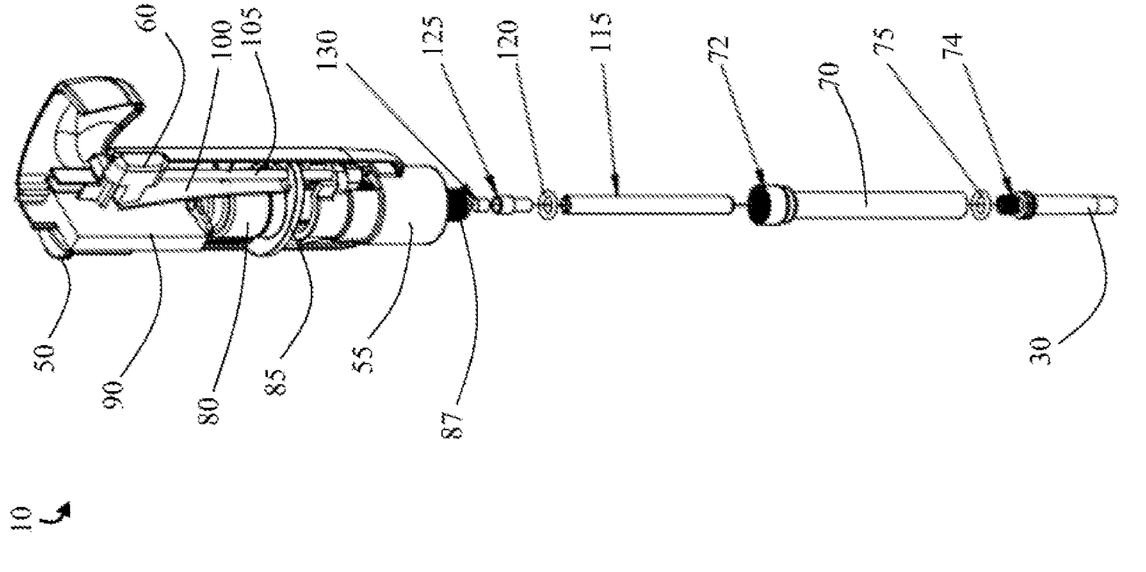
FIG. 3B is an exploded view of an exemplary pipetting device.
Figure 3D:
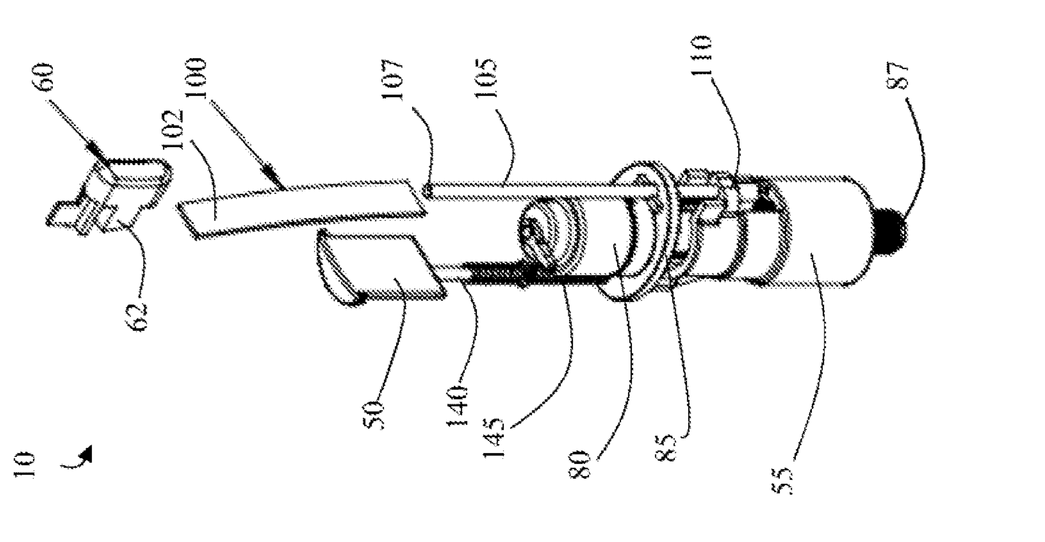
FIG. 3D is an exploded view of the drive unit of an exemplary pipetting device.
Figure 3E:
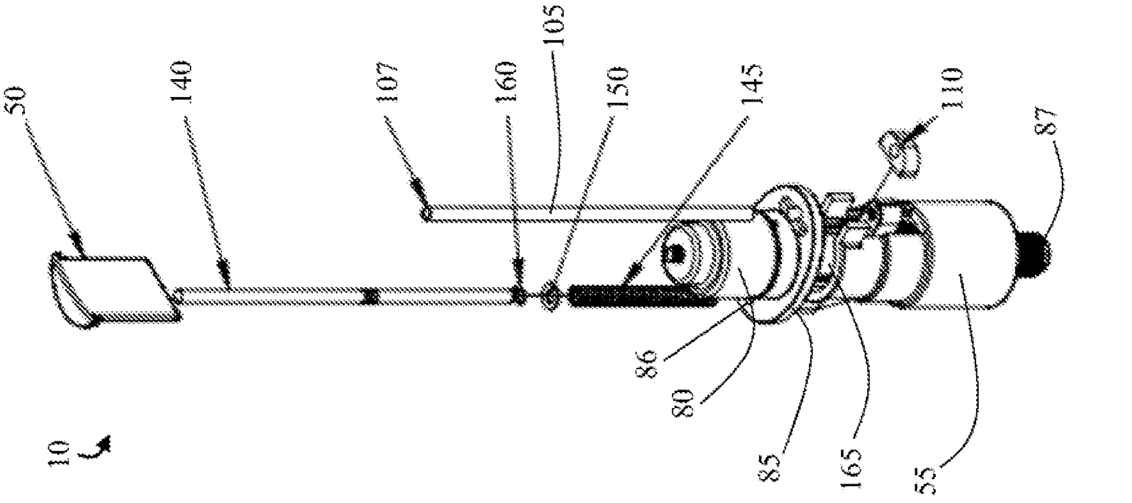
FIG. 3E is an exploded view of the drive unit of an exemplary pipetting device.
Figure 3F:
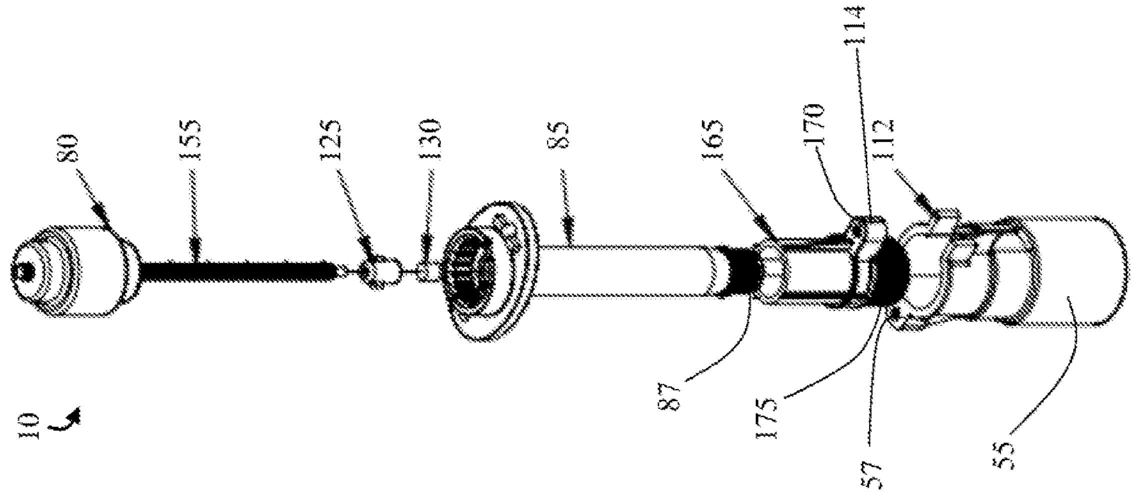
FIG. 3F is an exploded view of the drive unit of an exemplary pipetting device.

FIG. 3A illustrates the concentric configuration of the chamber cylinder 70, the large tip cylinder 65, and dispenser housing 20. The large tip cylinder 65 is disposed over the chamber cylinder 70 and attached to the small tip ejector member 165 by way of threads 67, 175 (see also FIG. 3F for best view of the small tip ejector member 165). The dispensing housing 20 is then disposed over the large tip cylinder 65 and attached to the large tip ejector member 55 by threads 22. The ejector element 50 is connected to the ejection rod 140. A biasing element 145 (e.g., spring) is circumferentially disposed around the ejection rod 140 to bias the ejection rod in the upwards position. The ejection rod 140 is passed through a hole 86 in a flange on the motor holder 85 and connected large tip ejector member 55 by insertion into a hole 57. A c-washer 160 and washer 150 may be included to hold the biasing element 145 in position. As the ejection element 50 is pressed down, it moves the ejection rod 140 against the biasing element 145. The ejection rod 140 moves the large tip ejector member 55 and dispenser housing 20 downwards in relation to the large tip holder 25. When a large pipette tip is attached to the large tip holder 25, the large tip ejection edge 35 of the dispenser housing 20 contacts the large pipette tip and dislodges it from the large tip holder 25. While the large tip cylinder 65 and the small tip ejection member 165 are separate components in the exemplary embodiments for easier disassembly and cleaning, they can be integral or part of the same component. Likewise, while the dispenser housing 20 and the large tip ejection member 55 are separate components in the exemplary embodiments for easier disassembly and cleaning, they can be integral or part of the same component When a small tip is attached to the small tip holder 30 and needs to be ejected, the end-user continues to press the ejector element 50. As the large tip ejector member 55 continues to be moved downward, a spacer 110 beneath the spacer arms 112 of the large tip ejector member 55 contacts a seat 114 of the small tip ejector member 165. As the large tip ejector member 55 and small tip ejector member 165 are moved together, the small tip ejector member 165 moves the large tip cylinder 65 downwards. The small tip ejection edge 40 of the large tip cylinder 65 contacts the small pipette tip and dislodges it from the small tip holder 30. As the ejector element 50 is released, the biasing element 145 moves the ejection rod 140 upwards to reset the cylinder positions. In this manner, the concentric cylinder design of the ejector mechanism enables the ejection of both small and large tips.

Figure 2G:
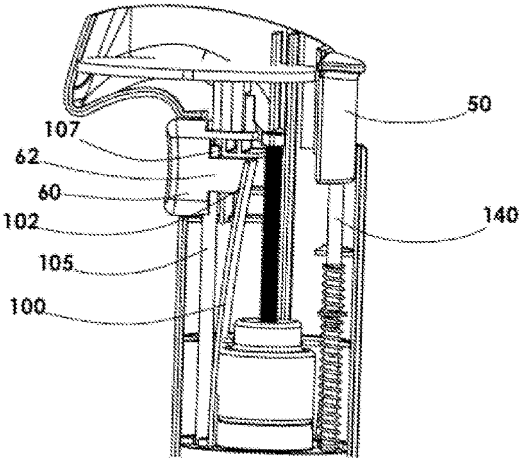
FIG. 2G depicts an internal view of an exemplary ejection mechanism and locking mechanism with the locking mechanism disengaged.

The locking mechanism is also shown in FIGS. 2G-21 and 3A-3F. As explained above, the locking mechanism can maintain the large tip cylinder 65 in the downward position to prevent contamination when large pipette tips are used and enables the use of large pipette filter tips. The locking mechanism embodiment shown in the drawings includes a locking trigger 60 with trigger projection 62 and a locking rod hole 108 through the bottom 109 of the trigger projection 62, a biasing element 100 (e.g., a leaf spring), and a locking rod 105 with a top surface 107. While this embodiment shows the ejection mechanism and locking mechanisms at opposite positions of the device, they can be positioned closer to each other or on the side of the device. The locking rod 105 is passed through a hole in the spacer element 110 and inserted into a hole 170 on the seat 114 of the small tip ejector member 165. As shown in FIG. 2G, when in the upward and unlocked position, the top surface 107 of the locking rod 105 is passed through the locking rod hole 108 in the trigger projection 62. The biasing element 100 biases the locking trigger 60 to the lateral and outward position in relation to the pipette housing 15 in both the locked and unlocked positions of the trigger 60. In the unlocked position, the locking trigger projection 62 pushes inward on the contact area 102 of the face of the biasing element 100, which simultaneously opposes this force. At the same time, the locking rod 105 prevents the locking trigger 60 from being moved outward due to the opposing force of the biasing element 100 against the locking trigger projection 62. As the ejector element 50 and ejection rod 140 are forced downward against the biasing element 145, the large tip ejector member 55 continues to be moved downward until the spacer 110 contacts the seat 114 of the small tip ejector member 165 and moves the small ejector member 165 downwards.

Figure 2H:
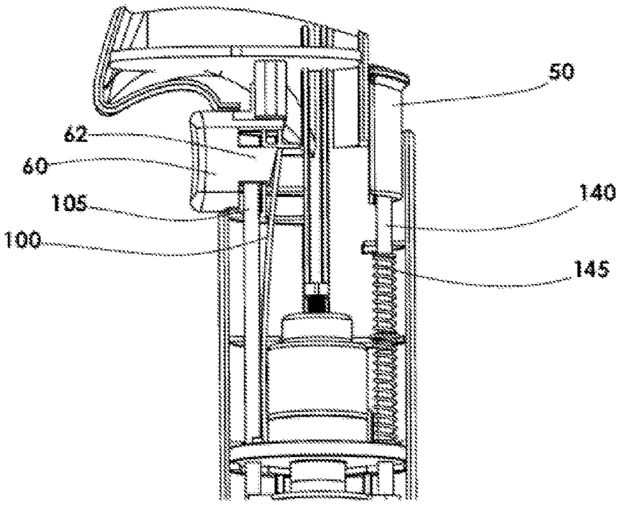
Figure 2I:
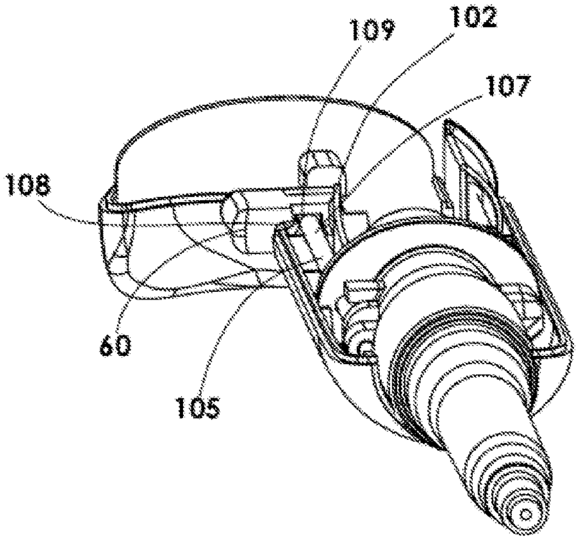

The downward position of the small ejector member 165 moves the locking rod 105 downward such that the top end 107 of the locking rod moves out of the locking hole 108 and clears the obstacle of the locking trigger 60, which allows the locking trigger 60 to snap into the horizontal/outward locked position as the top of the locking rod 107 contacts the bottom 109 of the locking trigger projection 62 (see FIGS. 2H and 21). The contact between the top of the locking rod 107 and the bottom 109 of the locking trigger projection 62 prevents the upward movement of the small ejector member 165 and, in turn, the large tip cylinder 65. As such, the small tip holder 30 does not extend significantly beyond the small tip ejection edge 40 (see FIG. 2E).

To release the locking mechanism, the end-user presses the locking trigger 60 to force the lateral movement of the locking trigger projection 62 against the biasing element 100. The trigger projection 62 slides across the top surface 107 of the locking rod 105 until the top surface of 107 meets the locking rod hole 108 in the trigger project 62 and is no longer in direct contact with the bottom 109 of the trigger projection 62. The top surface 107 of the locking rod 105 will then slide up into the locking rod hole 108 by the upward force applied to the small tip ejector member 165 and large tip cylinder 65 by the biasing element 145. When the locking rod 105 is back in the upwards position, the device is returned to the small tip configuration, which means that the small tip ejector member 165 and large tip cylinder 65 are moved upwards (see also FIG. 2C).

Figure 4:
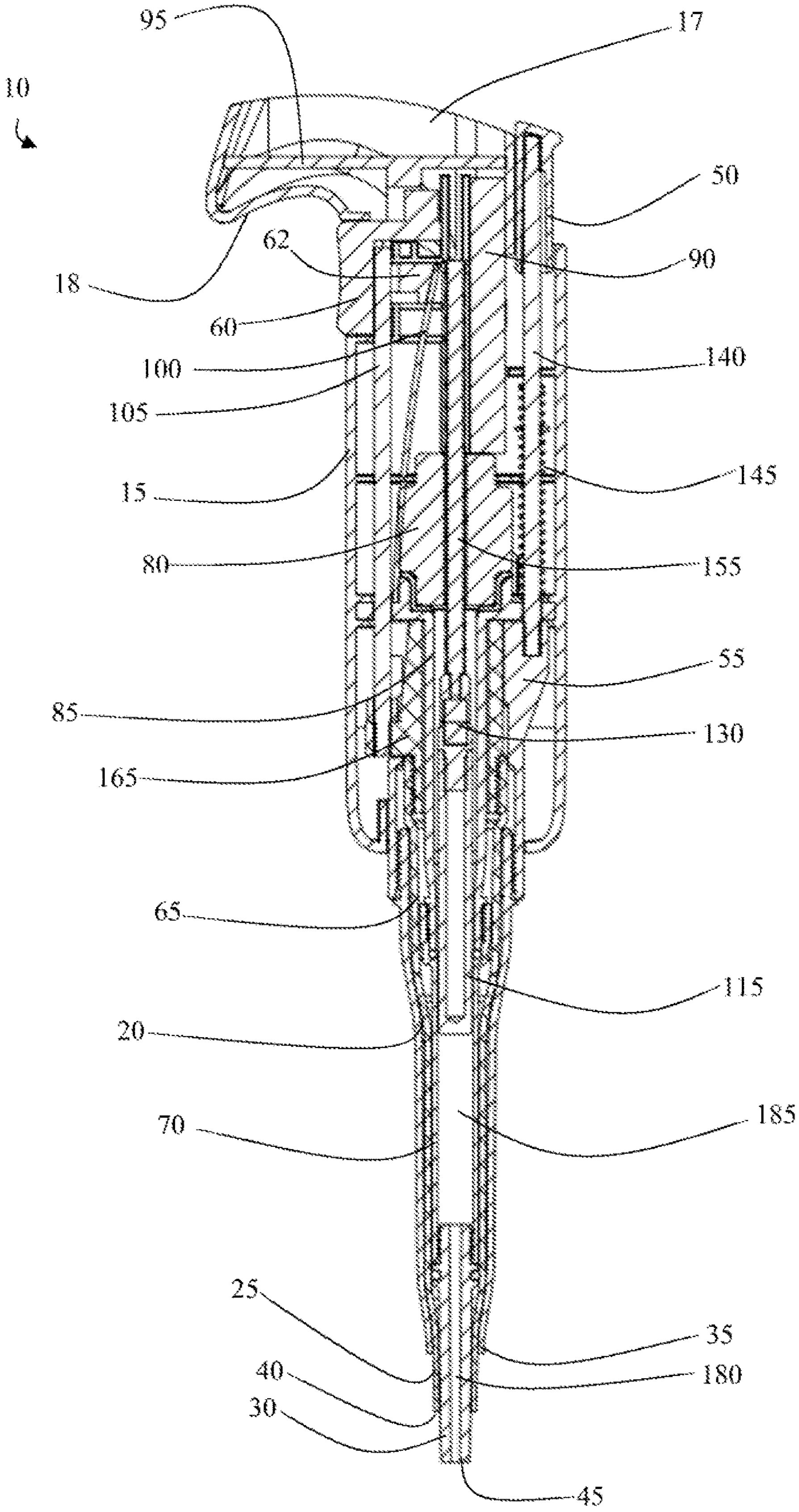
FIG. 4 is a cross-sectional diagram depicting an exemplary pipetting device.

FIG. 4. is a diagram of an exemplary pipetting device 10 with the concentric cylinder ejection mechanism and locking mechanism. The dispensing unit of the pipetting device 10 includes an opening 45 in fluid communication with a fluid path 180 that leads into a vacuum chamber 185 within the chamber cylinder 70. When a small pipette tip is being used, the small pipette tip (e.g., a 200 μl capacity tip) is attached to the small tip holder 30. In some embodiments, the pipetting device 10 includes an LCD screen and interface to enable the end-user to input the desired dispensing volume. In other embodiments, the pipetting device 10 may include volume control buttons or knobs as is known in the art. For the motor-controlled embodiment, the user then presses the actuator element 17, which sends a signal via the instrument control PCB 95 to the motor 80. The motor moves the threaded piston rod 155 and piston 115 upwards. As the piston 115 moves upwards within the vacuum chamber 185, the volumetric capacity of the vacuum chamber 185 increases and creates the vacuum necessary to cause a corresponding displacement of air into the fluid path 180, which air displacement draws a corresponding volume of liquid into the small pipette tip (e.g., about 1 μl to about 200 μl) pipette tip not shown). The end-user then presses the actuator element 17 again to cause the downward movement of the piston 115 and dispensing of the liquid out of the small pipette tip.

To eject the small pipette tip, the end-user then presses the ejector element 50, which moves the ejection rod 140 against the biasing element 145. The large tip ejector member 55 and dispenser housing 20 are moved downward until the spacer 110 contacts the seat 114 of the small tip ejector member 165. The small tip ejector member 165 and large tip cylinder 65 are then moved downwards so that the small tip ejection edge 40 dislodges the small pipette tip from the small tip holder 30. The end-user can then attach another small pipette tip and repeat the process, or switch to a large pipette tip. To use another small pipette tip, the end-user presses the locking trigger 60 against the biasing element 105 to let the locking rod 105 pass through the locking rod hole 108 in the locking trigger projection 62 thereby moving the small tip ejector member 165 and large tip cylinder 65 upwards.

If the end-user desires to use a large pipette tip (e.g., a pipette tip with a 1,000 μl capacity), the end-user first will press the ejector element 50 all the way down to let the locking rod 105 be locked into the downward position while not pressing/holding the locking trigger 60. As such, the locking trigger 60 will move outwards, and the locking trigger projection 62 will engage the top surface 107 of the locking rod 105 to prevent the upward movement of the locking rod 105, the small tip ejector member 165, and the large tip cylinder 65. In the locking configuration, the small tip holder 30 does not significantly extend beyond the small tip ejection edge 40, which enables attachment of the large pipette tip while preventing potential contamination of the fluid path 180 with liquid or enabling the attachment of a large pipette tip with a filter component.

The end-user then adjusts the volume settings as needed and presses the actuator element 17 to move the piston 115 upwards within the vacuum chamber 185 to force liquid to be drawn up the large pipette tip as described above (e.g., about 100 μl to about 1,000 μl). The liquid will then be dispensed when the actuator element 17 is pressed a second time. The end-user then presses the ejector element 50 to move the ejection rod 140 against the biasing element 145 thereby moving the large tip ejector member 55 and dispenser housing 20 downward until the large tip ejection edge 35 of the dispensing housing 20 dislodges the large pipette tip. To switch back to using small pipette tips, the end user presses the locking trigger 60 against the biasing element 100 to force the locking rod 105 back to the up position.

Figure 5A:
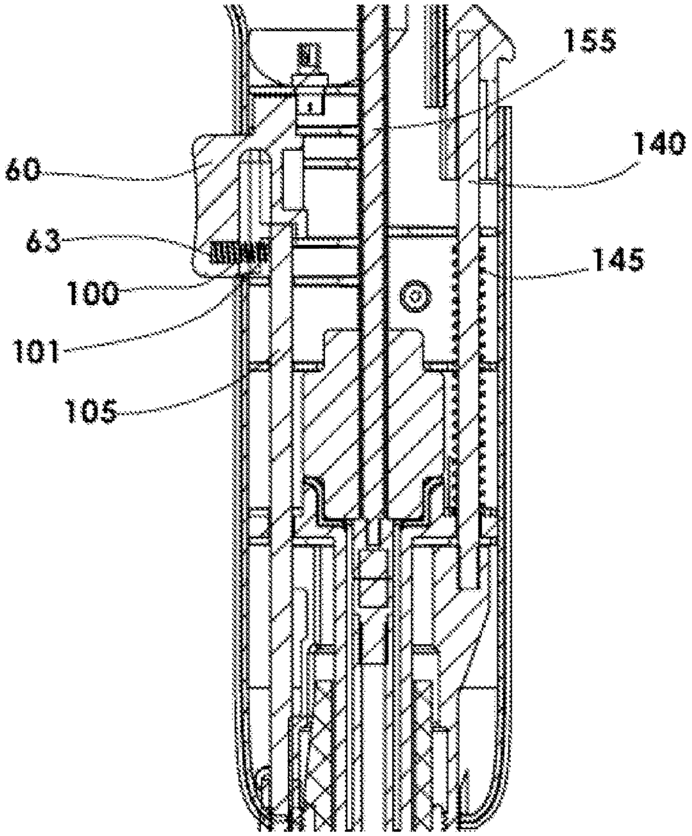
FIG. 5A is a cross-section diagram depicting an alternative embodiment of the locking mechanism.
Figure 5B:
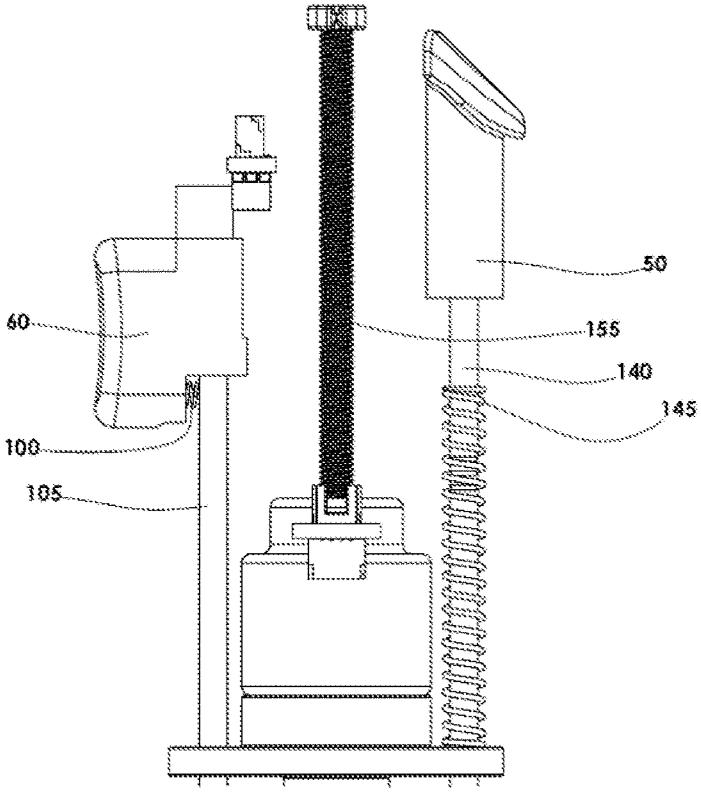
FIG. 5B is a perspective view of the alternative locking mechanism.

While the above depicts a leaf spring as the biasing element 100, other suitable embodiment employs a compression spring as the biasing element 100 that can be positioned between the locking trigger 60 and the locking rod 105, or between the locking trigger 60 and the pipette housing 15. FIGS. 5A and 5B depict an embodiment of the locking mechanism that includes a compression spring as the biasing element 100 placed between the locking trigger 60 and the locking rod 105. In this embodiment, the biasing element 100 (e.g., compression spring) is disposed within a bore 63 of the locking trigger 60. An end 101 of the biasing element 100 contacts the locking rod 105 to bias the locking trigger 60 to the lateral and outward position. Other designs suitable for maintaining pressure on the locking trigger 60 include a spring under tension, elastic material, or other suitable biasing element.

To further prevent contamination of the fluid path by liquid, some embodiments of the device will include an electronic sensor, such as, but not limited to an optic sensor, and a microcontroller programmed to recognize when the large tip cylinder is in the downward and locked position relative to the small tip holder or when the locking trigger is engaged. In this manner, the electronic sensor can detect when the small tip holder is exposed and therefore prevent the end-user from selecting an aspirating volume that is beyond the capacity of small pipette tips, for example, volume selections above 200 μl. Further, when the locking mechanism is engaged, the electronic sensor will enable the selections of volumes up to the large tip pipette capacity, such as up to 1,000 μl. Thus, the electronic sensor will provide an additional mechanism to prevent contamination caused by aspirating an amount of liquid beyond the small tip capacity, which would flood the fluid path with the overflow liquid. In some embodiments, the sensor can be mounted on the bottom of the PCB (or elsewhere) and can detect the position of the locking trigger. The locking trigger may include a small flange ("flag") that moves in and out of the optical sensor detection path. In this manner, when the optical sensor is blocked by the flag, the optical sensor will send a signal to the microcontroller, which will cause the display screen (e.g., LCD) of the device to provide options for only the relevant volume range and will further prevent the motor command for moving the motor more than the relevant volume.

REFERENCES

10—pipetting device
15—pipette housing
17—actuator element
18—hand rest
20—dispenser housing
22—threads
25—large tip holder
30—small tip holder
35—large tip ejection edge
40—small tip ejection edge
45—opening
50—ejector element
55—large tip ejector member
57—hole
60—locking trigger
62—trigger projection
63—bore (locking trigger)
65—large tip cylinder
67—threads
70—chamber cylinder
72—threads
74—threads
75—O-ring
80—motor
85—motor holder
87—hole
87—threads
90—rechargeable battery
95—printed circuit board
100—biasing element
101—biasing element end (for contacting locking rod)
102—contact area
105—locking rod
107—top of locking rod
108—locking rod hole
109—bottom of the trigger projection
110—spacer
112—spacer arms
114—spacer seat
115—piston
120—O-ring
125—top magnet holder
130—magnet
135—bottom magnet holder
140—ejection rod

145—biasing element
150—washer
155—piston rod
160—c washer
165—small tip ejector member
170—hole for locking rod
175—threads
180—fluid path
185—vacuum chamber

We claim:

1. A pipette with a multi-tiered pipette tip holder and ejection mechanism comprising:

a pipette body comprising an upper drive unit section and a lower dispensing section, the lower dispensing section comprising a small tip holder portion and a chamber cylinder and having a fluid inlet to enable fluid to be drawn into the chamber cylinder or discharged therefrom; and an ejection assembly comprising:

an ejector element, ejection rod, a first dispensing cylinder having a large tip holder portion and a small tip ejection edge, a second dispensing cylinder having a large tip ejection edge, wherein the first dispensing cylinder is concentric with at least a portion of the chamber cylinder and configured to move up and down in relation to the chamber cylinder, a first ejector member connected to the first dispensing cylinder, a second ejector member connected to the second dispensing cylinder, wherein the ejection rod is connected to the second dispensing cylinder, and wherein the second dispensing cylinder is concentric with at least a portion of the first dispensing cylinder and configured to move up and down in relation to the first dispensing cylinder;

wherein the ejection rod is configured to:

(i) contact the second dispensing cylinder and move the second dispensing cylinder to a first position wherein the large tip ejection edge contacts and ejects a large pipette tip from the large tip holder portion when a first force is applied to the ejector element; and (ii) cause the first dispensing cylinder to move to a second position wherein the small tip ejection edge contacts and ejects a small pipette tip from the small tip holder portion when a second force is applied to the ejector element, and wherein the second ejector member contacts and moves the first ejector member to the second position when the second force is applied to the ejector element.

2. The pipette of claim 1, wherein the fluid is air.

3. The pipette of claim 1, further comprising a biasing element disposed circumferentially around a portion of the ejection rod and configured to bias the ejection rod in an upwards position.

4. The pipette of claim 1, wherein the large tip holder portion comprises an outer diameter that is greater than the outer diameter of the small tip holder portion.

5. The pipette of claim 1, wherein the first ejector member and the second ejector member are positioned within the upper drive unit section, and wherein the first dispensing cylinder and the second dispensing cylinder form part of the lower dispensing section.

6. The pipette of claim 1, further comprising:

a piston slidably positionable within the chamber cylinder between an open position and a closed position; and a motor disposed within the upper drive unit section and operably connected to the piston and configured to actuate the piston between the open position and the closed position within the chamber cylinder;

wherein actuation of the piston to the open position defines a liquid volume to be aspirated by the pipette in an amount approximately equivalent to a fluid volume displaced by movement of the piston.

7. The pipette of claim 1, wherein the small tip holder portion is configured for attachment of a pipette tip having a maximum liquid capacity in a range from about 2 μl to about 200 μl.

8. The pipette of claim 1, wherein the large tip holder portion is configured for attachment of a pipette tip having a maximum liquid capacity in a range from about 200 μl to about 1,000 μl.

9. The pipette of claim 1, further comprising a locking mechanism comprising a trigger, biasing element, and locking rod movable between a locking position and an unlocking position, wherein movement of the second dispensing cylinder and the first dispensing cylinder to the second position causes the locking rod to move to the locking position and prevent upwards movement of the first dispensing cylinder.

10. The pipette of claim 9, wherein force applied to the trigger against the biasing element causes the locking rod to move to the unlocking position whereby the locking rod no longer prevents upwards movement of the first dispensing cylinder.

11. The pipette of claim 9, wherein the locking rod contacts a bottom side of the trigger when in the locking position.

12. The pipette of claim 9, further comprising a printed control board for controlling a motor in response to an end-user volume input and a sensor in electronic communication with another printed control board, wherein the sensor detects:

(i) when the first dispensing cylinder is unlocked and prevents the motor from causing a piston to move upwards to an open position to the extent that it defines a liquid volume to be aspirated by the pipette that exceeds a maximum liquid capacity of the small pipette tip; or (ii) when the first dispensing cylinder is locked and allows the motor to cause the piston to move upwards to the open position to the extent that it defines a liquid volume to be aspirated by the pipette that exceeds the maximum liquid capacity of the small pipette tip; or (iii) both (i) and (ii).

13. A method of replacing a pipette tip on a pipette, the method comprising:

(a) providing the pipette of claim 1, wherein a small pipette tip is attached to the small tip holder portion, and applying force to the ejector element until the small tip ejection edge contacts and dislodges the small pipette tip from the small tip holder portion; or (b) providing the pipette of claim 1, wherein a large pipette tip is attached to the large tip holder portion, and applying force to the ejector element until the large tip ejection edge contacts and dislodges the large pipette tip from the large tip holder portion.

14. The method of claim 13, further comprising:

the step of inserting the small tip holder portion into a pipette receiving end of a small pipette tip so as to create an interference fit, or the step of inserting the large tip holder portion into a pipette receiving end of a large pipette tip so as to create an interference fit.

15. A pipetting device with a multi-tiered pipette tip holder and ejection mechanism comprising:

an elongated pipette body comprising an air inlet at a dispensing end;

an ejector element;

a concentric cylinder assembly comprising:

a chamber cylinder in fluid communication with the dispensing end, a small tip ejection cylinder having a small tip ejection edge and a large tip holder portion, and a cylindrical dispenser housing having a large tip ejection edge, wherein:

the chamber cylinder is concentrically received within at least a portion of the small tip ejection cylinder;

the small tip ejection cylinder is concentrically received within at least a portion of the cylindrical dispenser housing and configured to move up and down in relation to the chamber cylinder;

the cylindrical dispenser housing is configured to move up and down in relation to the small tip ejection cylinder;

an ejection rod in mechanical communication with the ejector element and configured to:

cause the cylindrical dispenser housing to move to a first position wherein the large tip ejection edge contacts and ejects a large pipette tip from the large tip holder portion when a first force is applied to the ejector element; or cause the small tip ejection cylinder to move to a second position wherein the small tip ejection edge contacts and ejects a small pipette tip from a small tip holder portion of the elongated pipette when a second force is applied to the ejector element; and a locking mechanism comprising:

a trigger, a biasing element, and a locking rod movable between a locking position and an unlocking position, wherein movement of the cylindrical dispenser housing and the small tip ejection cylinder to the second position causes the locking rod to move to the locking position and prevent upwards movement of the small tip ejection cylinder.

16. The pipetting device of claim 15, further comprising a first ejection member connected to the small tip ejection cylinder, and a second ejection member connected to the ejection rod and to the cylindrical dispenser housing, wherein:

(i) the ejection rod moves the second ejection member and the cylindrical dispenser housing to the first position when a first force is applied to the ejector element; or (ii) the ejection rod causes the second ejection member to contact and move the first ejection member and small tip ejection cylinder to the second position when the second force is applied to the ejector element.

17. The pipetting device of claim 15, wherein force applied to the trigger against the biasing element causes the locking rod to move to the unlocking position whereby the locking rod no longer prevents upwards movement of the small tip ejection cylinder.

18. The pipetting device of claim 15, wherein the locking rod contacts a bottom side of the trigger when in the locking position.

19. The pipetting device of claim 15, further comprising:

a piston slidably positionable within the chamber cylinder between an open position and a closed position; and a motor operably connected to the piston and configured to actuate the piston between the open position and the closed position within the chamber cylinder;

wherein the actuation of the piston to the open position defines a liquid volume to be aspirated by the pipette in an amount approximately equivalent to a fluid volume displaced by the movement of the piston.

20. The pipetting device of claim 15, wherein a motor is mechanically connected to a threaded piston, wherein the threaded piston is connected to the piston by one or more magnets.

21. The pipetting device of claim 15, further comprising a printed control board for controlling a motor in response to an end-user volume input and a sensor in electronic communication with a printed control board, wherein the sensor detects:

(i) when the small tip ejection cylinder is unlocked and prevents the motor from causing a piston to move upwards to an open position to the extent that it defines a liquid volume to be aspirated by the pipette that exceeds a maximum liquid capacity of a small pipette tip; or (ii) when the small tip ejection cylinder is locked and allows the motor to cause the piston to move upwards to the open position to the extent that it defines a liquid volume to be aspirated by the pipette that exceeds the maximum liquid capacity of the small pipette tip; or (iii) both (i) and (ii).

22. A pipette with a multi-tiered pipette tip holder and ejection mechanism comprising:

a pipette body comprising an upper drive unit section and a lower dispensing section, the lower dispensing section comprising a small tip holder portion and a chamber cylinder and having a fluid inlet to enable fluid to be drawn into the chamber cylinder or discharged therefrom; and an ejection assembly comprising:

an ejector element, ejection rod, a first dispensing cylinder having a large tip holder portion and a small tip ejection edge, a second dispensing cylinder having a large tip ejection edge, wherein the first dispensing cylinder is concentric with at least a portion of the chamber cylinder and configured to move up and down in relation to the chamber cylinder, and wherein the second dispensing cylinder is concentric with at least a portion of the first dispensing cylinder and configured to move up and down in relation to the first dispensing cylinder;

wherein the ejection rod is configured to:

(i) contact the second dispensing cylinder and move the second dispensing cylinder to a first position wherein the large tip ejection edge contacts and ejects a large pipette tip from the large tip holder portion when a first force is applied to the ejector element; or cause the first dispensing cylinder to move to a second position wherein the small tip ejection edge contacts and ejects a small pipette tip from the small tip holder portion when a second force is applied to the ejector element; and a locking mechanism comprising:

a trigger, a biasing element, and a locking rod movable between a locking position and an unlocking position, wherein movement of the second dispensing cylinder and the first dispensing cylinder to the second position causes the locking rod to move to the locking position and prevent upwards movement of the first dispensing cylinder.

* * * * *